US008566460B1

(12) United States Patent
Liu et al.

(10) Patent No.: US 8,566,460 B1
(45) Date of Patent: Oct. 22, 2013

(54) METHOD AND APPARATUS FOR INITIATING TEMPORARY CONFIGURATION ALLOWING REMOTE ACCESSING VIA A NETWORK DEVICE

(75) Inventors: David Hwa-Wei Liu, Herndon, VA (US); Edward J. Krzyzanowski, Naperville, IL (US); James M. Hallam, Oswego, IL (US)

(73) Assignee: Tellabs Operations, Inc., Naperville, IL (US)

( * ) Notice: Subject to any disclaimer, the term of this patent is extended or adjusted under 35 U.S.C. 154(b) by 422 days.

(21) Appl. No.: 12/882,424

(22) Filed: Sep. 15, 2010

(51) Int. Cl.
G06F 15/16 (2006.01)

(52) U.S. Cl.
USPC ............................................ 709/228

(58) Field of Classification Search
USPC .................. 709/220–222, 227, 228; 710/9; 370/395.3
See application file for complete search history.

(56) References Cited

U.S. PATENT DOCUMENTS

| 7,586,854 | B2 * | 9/2009 | Megarity et al. | 370/254 |
| 7,668,100 | B2 * | 2/2010 | Balasaygun et al. | 370/235 |
| 7,903,675 | B2 * | 3/2011 | Lee | 370/401 |
| 7,965,693 | B2 * | 6/2011 | Jiang et al. | 370/338 |
| 8,060,623 | B2 * | 11/2011 | Vogel et al. | 709/228 |
| 2006/0039384 | A1 * | 2/2006 | Dontu et al. | 370/400 |
| 2007/0183337 | A1 * | 8/2007 | Cashman et al. | 370/250 |
| 2009/0164648 | A1 * | 6/2009 | Xu et al. | 709/228 |
| 2011/0292938 | A1 * | 12/2011 | Harp et al. | 370/392 |

OTHER PUBLICATIONS

Allan Leinwand, Bruce Pinsky, Cisco Router Configuration, 2nd Ed, 2001.*
Microsoft, Change your screen resolution, Dec. 6, 2006.*
Cisco, Errdisable Port State Recovery on the Cisco IOS Platforms, Apr. 17, 2009.*
Kevin Fitchard, Cingular unifying backhaul with Tellabs gear, Sep. 11, 2006.*
Cisco, Configuring the Cisco NM-1A-T3/E3 Network Module, Jun. 28, 2007.*
Cisco, Catalyst 2948G-L3 Sample Configurations—SingleVLAN, Multi-VLAN, and Multi-VLAN Distribution Layer Connecting to Network Core, Aug. 30, 2005.*
Cisco, Configuring IMA Port Adapter Interfaces, Chp 20, 2001.*

* cited by examiner

*Primary Examiner* — Lance L Barry
(74) *Attorney, Agent, or Firm* — James M. Wu; JW Law Group

(57) ABSTRACT

A method and apparatus for establishing a network connection using a temporary Internet Protocol ("IP") address are disclosed. The process, in one embodiment, is operable to detect link status from a link which is connected to a port of an access device. After identifying a link configuration from a set of predefined link configurations in accordance with the link status, an interface corresponding to the link configuration is enabled. Once a temporary IP address associated with the interface is assigned, the process sends a message indicating that the access device is reachable via the link in accordance with the temporary IP address.

22 Claims, 12 Drawing Sheets

```
interface ima50
    atm ima member pdh1/9:0
    atm ima member pdh1/10:0
    atm ima member pdh1/12:0
    atm ima member pdh1/12:0
    atm ima member pdh1/13:0
    atm ima member pdh1/14:0
    atm if-type uni
    atm if-overbooking 1000
!
interface ima50.2
    atm egress-buffer-size 200
    atm traffic-params servcat ubr confdef ubr.1 pcr 21000
21000
    atm supp-serv-cat ubr
!
interface ima50.2.99
    description "OAM Sub-interface to Network"
    ip mtu 1500
    no shutdown
   ip address 10.0.0.2/30
!
```
502

500

```
interface pdh2/1
    pdh report ds3 ais
    pdh report ds3 rai
    port-protocol atm
!
interface pdh2/1
    atm if-type uni
!
interface pdh2/1#atm#2
!
interface pdh2/1#atm#2.99
    atm usage terminated
    atm usage aal5-sdu terminated
!
interface pdh2/1#atm#2.99
    description "OAM Sub-interface to Network"
    ip mtu 1500
    no shutdown
    ip address 11.0.0.2/30
     ip ospf authentication message-digest
     ip ospf message-digest-key-chain ospf1
!
```
504

FIG 5A

```
config t
interface ge0/0
mtu 1600
no shutdown
!
interface ge0/0.1000
ip mtu 1500
no shutdown
ip address 12.0.0.2/30
!
interface ge0/0.2000
ip mtu 1500
no shutdown
ip address 13.0.0.2/30
!
```

METHOD AND APPARATUS FOR INITIATING TEMPORARY CONFIGURATION ALLOWING REMOTE ACCESSING VIA A NETWORK DEVICE

FIELD

The technical field of embodiments of the present invention relate to communication networks. More specifically, embodiments of the present invention relate to establishing a network connection remotely using a temporary configuration(s).

BACKGROUND

With increasing demand for more information to be supplied to homes and/or businesses, many network communication providers are switching or upgrading their networks to high-speed communication signaling protocol, such as Digital Signal 3 ("DS3") or T3. High-speed communication signaling protocol typically enhances bandwidth and speed for audio, video, and data transmission to/from homes and/or businesses. For the mobile communication industry, wireless providers are transitioning from a traditional GSM (Global System for Mobile) or 2G (second-generation) wireless service using T1 interfaces to more data intensive 3G or 4G services. Such transitioning, migrating, and/or transforming of network configurations generally require carriers or providers to redesign or revamp existing backhauling wired and/or wireless networks. Due to limited performance from the existing network configuration such as T1 line, carriers have begun to replace alternative high-speed backhaul communications network to increase the speed as well as bandwidth for data traffics.

Conventional access devices such as Smart Integrated Access Devices ("SIAD") have been deployed across large geographical territories, sometimes several continents, for facilitating global network communications via various backhaul networks. When a traditional access device or SIAD is installed, a usual way to connect the access device to a network involves a manual onsite configuration procedure. For example, a field technician needs to login the SIAD via a serial port and download necessary basic configuration to the SIAD before the SIAD can be connected to a network. After loading the basic configuration, the access device or SIAD can be accessed remotely.

A problem associated with the traditional access device or SIAD is the manual onsite configuration procedure because it not only consumes resources but also affects overall network performance.

SUMMARY

A process and/or access device capable of establishing a network connection using a temporary Internet Protocol ("IP") address is disclosed. The process, in one embodiment, is operable to detect link status from a link which connects the access device and a core router. After identifying a link configuration from a set of predefined link configurations in accordance with the link status, an interface corresponding to the link configuration is enabled. Once a temporary IP address associated with the interface is assigned, the process sends a message indicating that the access device is reachable via the link in accordance with the temporary IP address.

Additional features and benefits of the exemplary embodiment(s) of the present invention will become apparent from the detailed description, figures and claims set forth below.

BRIEF DESCRIPTION OF THE DRAWINGS

Exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 5A-B illustrate preloaded code, pseudo program, and/or scripts for establishing temporary connections having loaded onto an access device in accordance with one embodiment of the present invention;

DETAILED DESCRIPTION

Exemplary embodiment(s) of the present invention is described herein in the context of a method, system and apparatus of provisioning a temporary network connection for an access device using a temporary configuration.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," et cetera, indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

Embodiment(s) of the present invention discloses an access device and a process capable of temporarily provisioning a network connection using a temporary Internet Protocol ("IP") address. After detecting the link status from a link via a port of the access device, the process identifies a link configuration in accordance with a set of predefined link configurations in view of the link status. An interface corresponding to the link configuration is subsequently enabled. After a temporary IP address associated with the interface is assigned, the process sends a message to an upstream router indicating that the access device is reachable via the temporary IP address.

Figure 1:
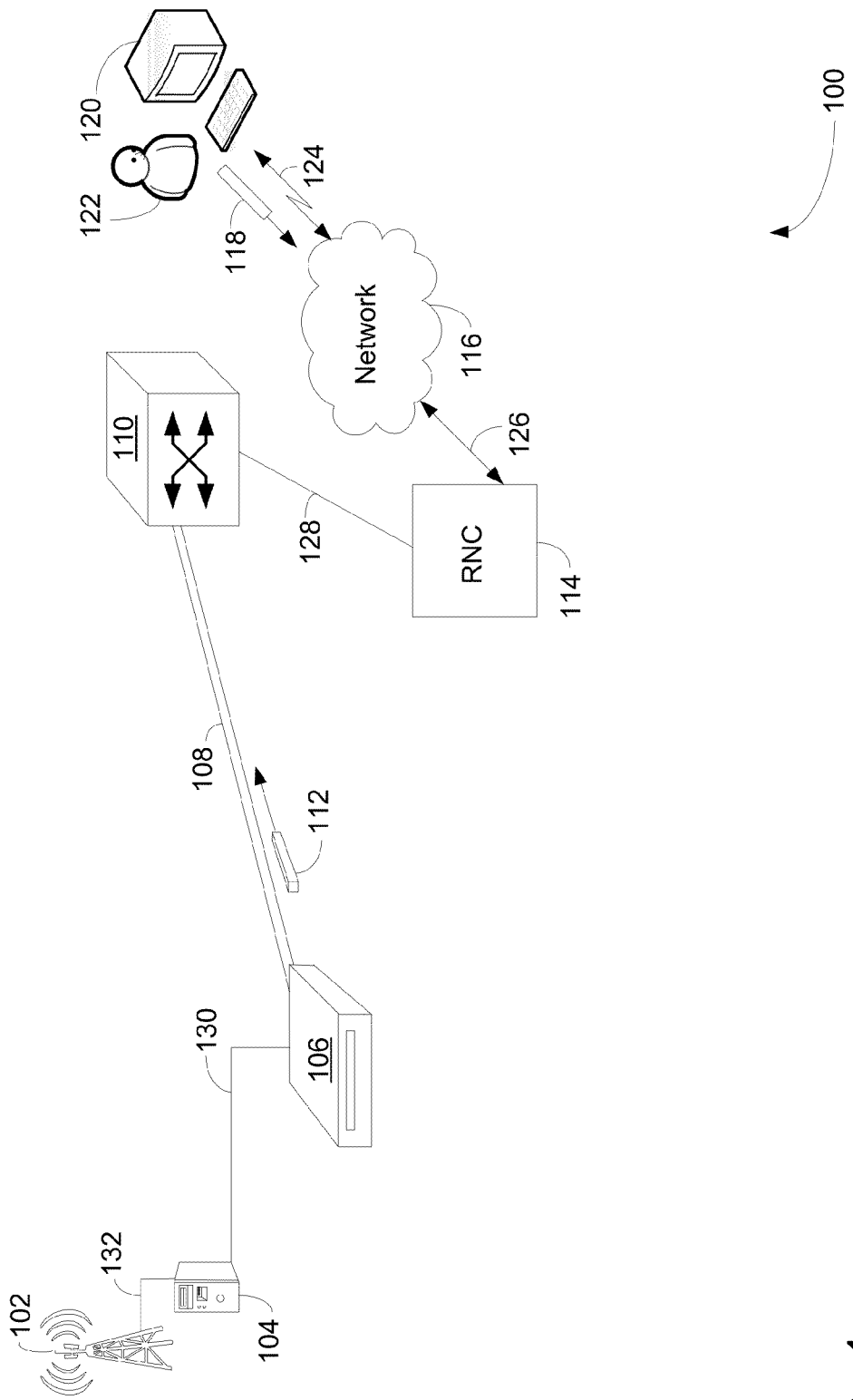
FIG. 1 is a block diagram illustrating a communications network having a network device capable of establishing a connection using a temporary IP address in accordance with one embodiment of the present invention.

FIG. 1 is a block diagram 100 illustrating a communications network having a network device capable of establishing a connection using a temporary IP address in accordance with one embodiment of the present invention. Diagram 100 includes a Node B 104, an access device 106, a core router 110, and a user 122, wherein user 122 is able to communicate with core router 110 via a radio network controller ("RNC") 114. User 122, for example, is able to communicate with access device 106 through several connecting hops from user's system 120, a network 116, to core router 110. It should be noted that the underlying concept of the embodiment does not change if one or more network devices were added to or removed from diagram 100.

Core router 110, also known as a router, a multi-service router, a switcher, or a bridge, routes information or data between network devices using one or more network protocols. Core router 110, for instance, interconnects multiple computer networks to route data from sources to destinations. To route information or data between two or more network interfaces, core router 110, in one embodiment, is configured to use carry's protocols, configurations, and/or standards, such as Ethernet, T1, DS3, et cetera. It should be noted that the terms "carry protocol," "carry configuration," "carry standard," "link protocol," "link configuration," "link standard," "port configuration," "port standard," and "port protocol" mean similar standard(s) and can be used interchangeably.

Access device 106 is a network switching device for switching and supervising data traffic between one or more network devices. Upon proper setup, access device 106 can be accessed and managed remotely over a connected network. In one embodiment, access device 106 includes an initial provisioning capability ("IPC") which is capable of temporarily provisioning a connection(s) to a network. For example, access device or SIAD 106 is a simple remote router supervising data transfer over wired and/or wireless backhauls. The term "access device" and "SIAD" are herein used interchangeably.

The IPC, in one aspect, includes multiple modules, such as a monitor, an enabler, and a transmitter used for provisioning a temporary configuration in accordance with the detected link status. The IPC can be implemented by hardware, firmware, software, or a combination of hardware, firmware, and software components. For example, access device 106 may include a digital processor such as a switching engine or a cluster of switching engines (or controllers) capable of implementing functions of the IPC using one or more memory devices.

Node B 104 employs connections 130-132 to connect a cellular tower or a base station 102 and access device 106. Note that connections such as connections 130-132 may be referred to as cables, land wires, wireless signals, coaxial cables, optical fibers, and the like. Under the standard of UMTS (Universal Mobile Telecommunications Service), Node B can be considered as a BTS (base transceiver station) in which Node B includes radio frequency transmitter(s) and the receiver(s) for communicating with mobiles. Node B 104 may also couple to a wired and/or land based computing network for data transmission.

RNC 114 is a network managing element designed to manage a connected Node B such as Node B 104. RNC 114 provides radio resource management including data encryption and/or decryption before the data reaches its destination(s) such as user 122. Referring back to FIG. 1, RNC 114 may be used to manage Node B 104 through network devices such as core router 110. It should be noted that additional network devices can be added or removed between RNC 114 and core router 110 as well as between RNC 114 and user 122.

User 122 can be an individual person, an administrator, an organization, or a group of people who is able to access SIAD 106 remotely via a system 120. System 120 employs connections 124-128 to connect to core router 110 via a communications network 116 and RNC 114. Network 116, for example, can be a wide-area network ("WAN"), a Public Switched Telephone Network ("PSTN"), or a combination of WAN and PSTN. WAN, in one aspect, includes the Internet, or other proprietary networks including America On-Line™, SBC™, Microsoft Network™, and Prodigy™. Note that network 116 may include network backbones, long-haul telephone lines, Internet service providers, various levels of network routers, and/or other means for routing data between various network devices attached to the network.

In operation, after setting up scripts for enabling and recognizing the temporary IP address(es) at core router 110, SIAD 106 is installed at a remote location or cell site. Upon powering up, the monitor of SIAD 106 begins to monitor link status at the interfaces or ports. As soon as detecting a link status update from a link coupled to core router 110, the monitor identifies a link configuration in accordance with the link status. The enabler of SIAD 106 subsequently enables an interface corresponding to the link configuration and assigns a temporary IP address associated with the interface. After establishing or provisioning a temporary configuration, the transmitter sends a message 112 to core router 106 via link 108 indicating that SIAD 106 is currently reachable through the temporary IP address. The link configuration, for example, can either be a digital signal 3 ("DS3"), Ethernet, or T1 IMA (Inverse Multiplexing ATM). Once a temporary network connection is established, a user 122 can remotely communicate with SIAD 106 via core router 110, and is able to provide a permanent configuration 118. Upon receiving permanent configuration 118 from core router 110, the temporary configuration at SIAD is replaced with the permanent configuration. It should be noted that the underlying concept of the embodiment does not change if other types of link configuration such as E3 were used in diagram 100.

An advantage of using the IPC for an access device is to allow a user to remotely provision the access device without manual onsite configuration procedure whereby the installation process of an access device or SIAD is simplified. For example, with the enhancement and implementation of the IPC of SIAD (or access device), the procedure of manual onsite configuration is no longer required.

Figure 2A:
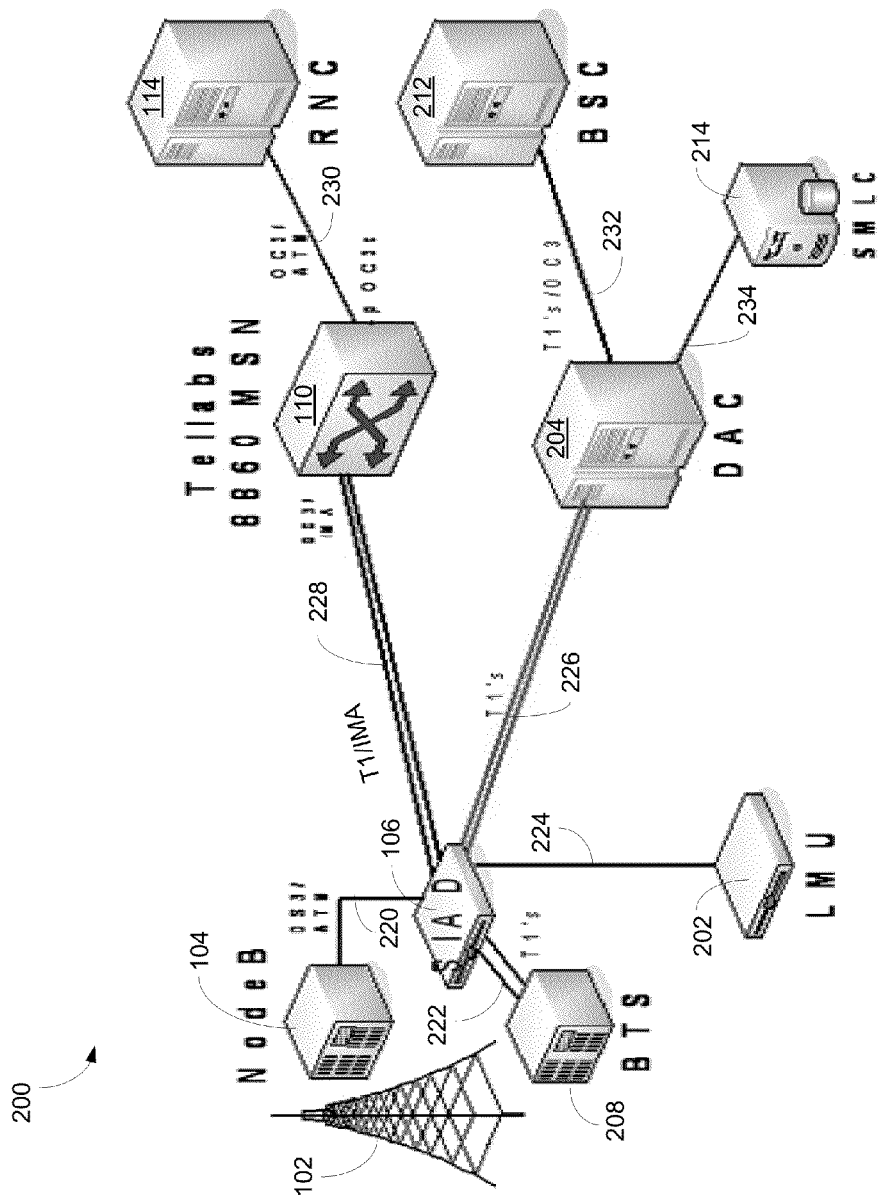
FIGS. 2A-C illustrate exemplary communications networks employing temporary IP addresses to establish network connections in accordance with one embodiment of the present invention.
Figure 2B:
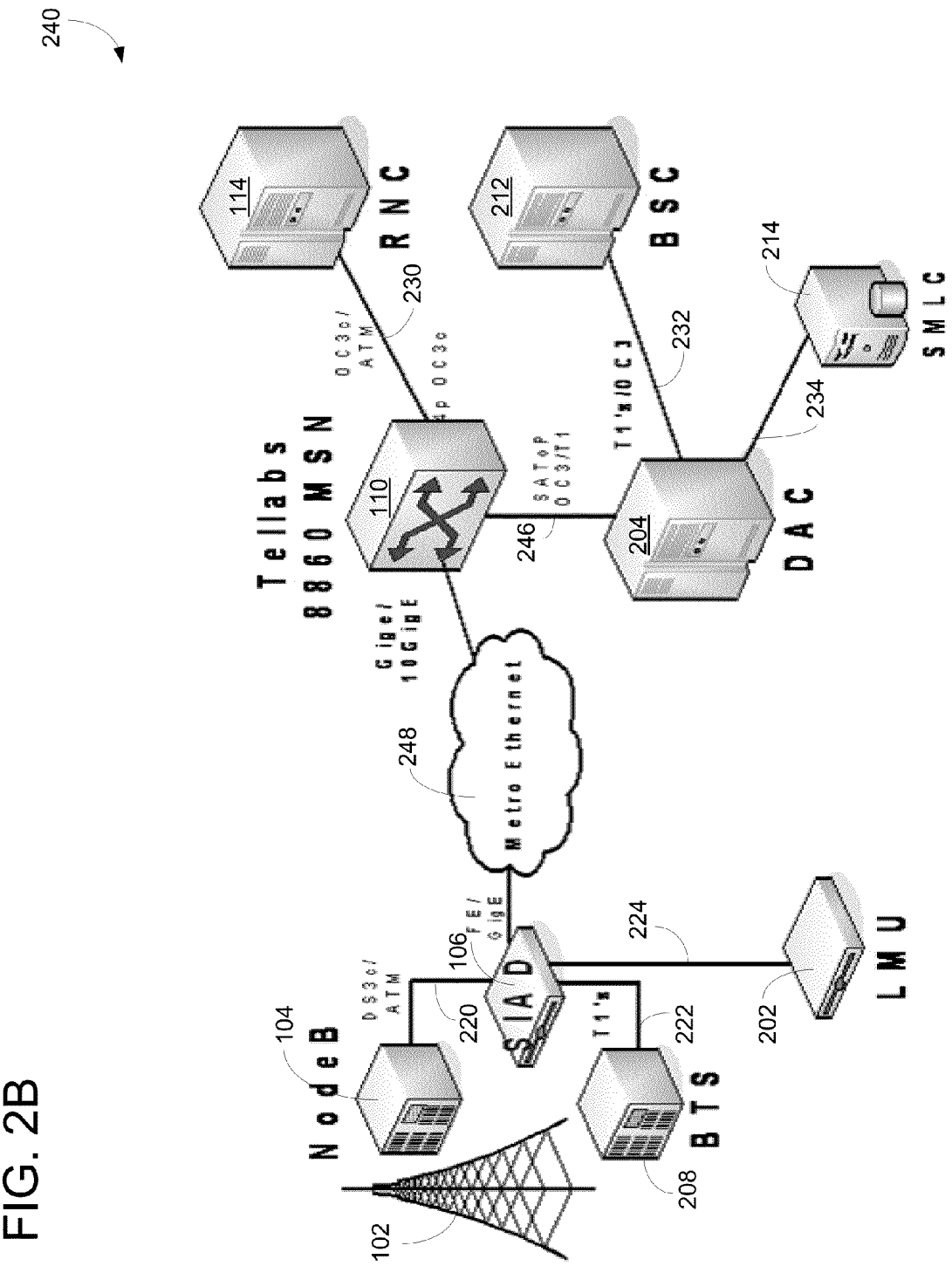
Figure 2C:
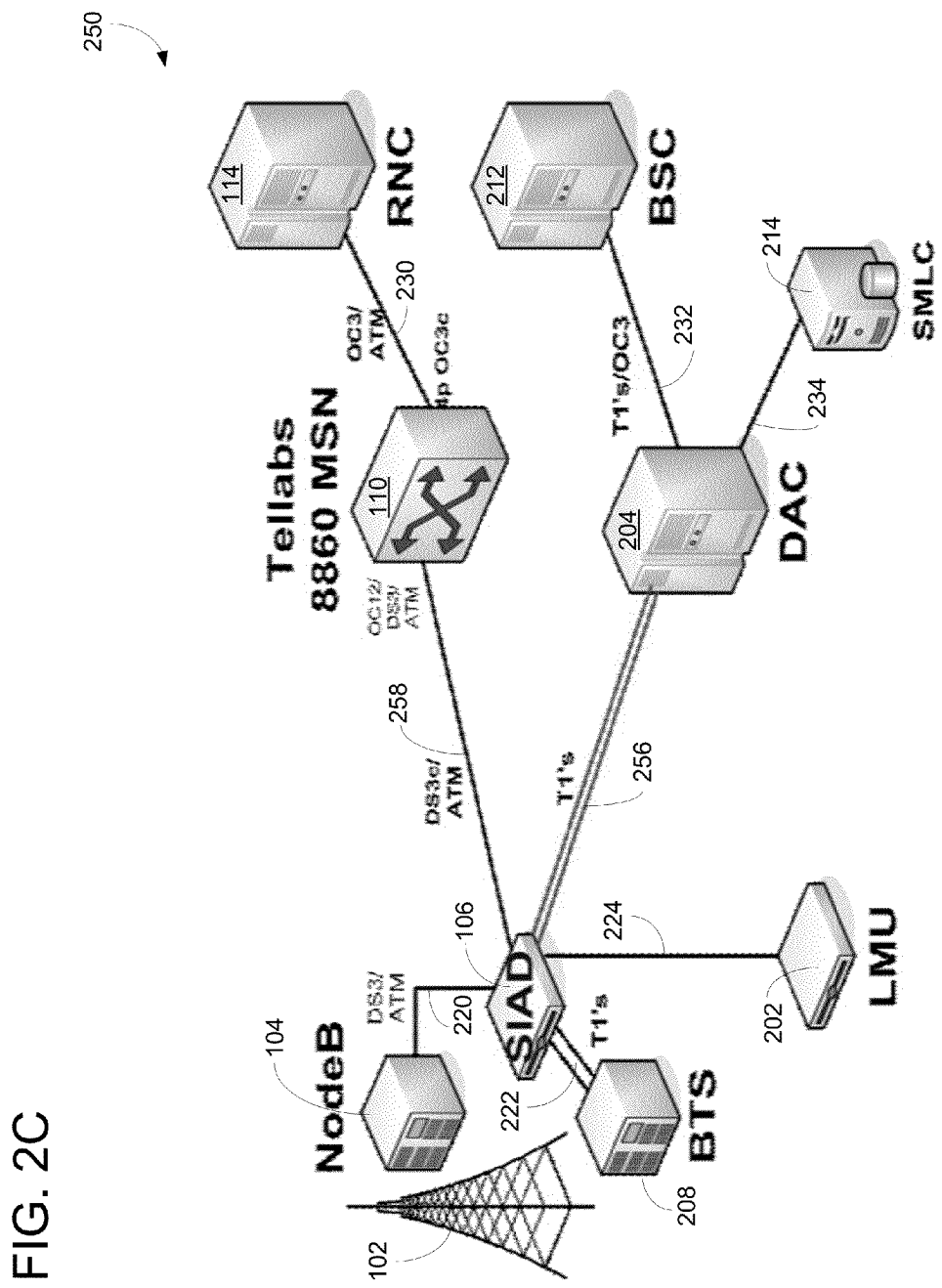

Core router 110 is a versatile network routing device that is able to transmit data over various links with various link configurations or protocols, such as DS3, Ethernet, and/or T1 IMA link configurations. To effectively communicate with core router 110, access device 106, in one embodiment, is configured to be able to handle various different link configurations to simplify the provisioning process. FIGS. 2A-C illustrate IPC implementations via exemplary DS3, Ethernet, and/or T1 IMA network communication(s).

FIG. 2A is a block diagram 200 illustrating an exemplary communications network using T1 IMA circuit for data transmission with SIAD 106 capable of implementing temporary configuration in accordance with one embodiment of the present invention. Diagram 200 includes SIAD 106, a core router 110, and a digital-to-analog converter ("DAC") 204 connected by connections 226-228 wherein SIAD 106 as described in FIG. 1 includes an IPC capable of temporarily provisioning of a network connection. Connection 228 employs T1 IMA circuits as a data carry while connection 226 uses regular T1 circuits for data transmission. It should be noted that the underlying concept of the embodiment does not change if one or more functional devices were added to or removed from system 200.

T1 IMA is a physical layer technology capable of transmitting data stream using division multiplexing data stream(s) across a T1 or E1 link. Once the divided data streams reach their destination(s), data streams are reconstructed into the original data stream(s) whereby the overall speed of data transmission is improved. During operation, when SIAD 106 detects a T1 IMA link configuration at its port(s) coupled to connection 228, SIAD 106 is able to provision a temporary T1 IMA link configuration. After notifying the temporary network connection, core router 110 forwards a permanent network configuration to SIAD 106 using the temporary IP address(es). It should be noted that when SIAD 106 is configured to use T1 IMA as its backhaul, the existing T1 IMA links used for long haul transmission remain the same. The short haul transport such as data transport from Node B 104 to SIAD 106 may change from T1/IMA to DS3 to improve the performance. Additional T1 lines, in one aspect, can be added to increase from original 8 T1 lines to 14 T1 lines for the long haul.

Referring back to FIG. 2A, SIAD 106 is also coupled to Node B 104, a cellular tower 102, a BTS (Base Transceiver Station) 208, and a LMU (Location Measurement Unit) 202 via connections 220-224. LMU 202 is able to measure wireless or radio signals to identify surrounding or nearby cellular stations served by a serving mobile location center ("SMLC"). BTS 208, which is also known as cell site, is a network device capable of facilitating wireless communications between user's devices and a network(s). It should be noted that SIAD 106 can couple to additional network devices such as a node and/or other base stations.

While core router 110 is coupled to RNC 114 via connection 230, DAC 204 is connected to a BSC (Base Station Controller) 212 and a SMLC 214 via connections 232-234. DAC 204, in one example, is used to convert analog signal(s) to digital signal(s) and vice versa for facilitating data transfer and processing. BSC 212 is also known as base station subsystem capable of handling network traffic between user's portable devices and network devices. Note that BSC may be physically located within the BTS. SMLC 214 is a network device or element configured to control one or more LMUs. Note that SMLC may be resided or placed in BSC 212.

An advantage of using SIAD 106 with IPC is to provide a method for a remote user to gain access to SIAD 106 such as reconfiguring SIAD remotely. Another advantage of using SIAD 106 with IPC is to simplify device installation process because dispatching a technician to download basic configuration to SIAD 106 is no longer needed. As soon as SIAD 106 is powered up, it allows remote access by a user or administrator using temporary IP address(es).

FIG. 2B is a block diagram 240 illustrating an exemplary communications network using Ethernet or Metro Ethernet circuit for data transmission with SIAD 106 capable of implementing temporary configuration in accordance with one embodiment of the present invention. Diagram 240 includes SIAD 106, a core router 110, and a digital-to-analog converter ("DAC") 204 connected by connections 246-248. SIAD 106, as described in FIG. 1, includes an IPC capable of provisioning a temporary link configuration when SIAD 106 is initially powered up. Connection 248 uses Metro Ethernet circuit as a data carry while connection 246 uses OC3 circuit as data carry. It should be noted that the underlying concept of the embodiment does not change if one or more network devices were added to or removed from system 240.

Ethernet circuit 248 is a standardized communication signaling protocol which is also known as Ethernet, Metro Ethernet ("MetroE"), Fast Ethernet ("FE"), or Gigabit Ethernet ("GbE") defined under IEEE 802.3. Ethernet, in one example, includes a combination of twisted pair versions of Ethernet cable for coupling between a network device and a network. Ethernet, together with fiber optics, is widely used for LAN (local area network) communication technology. MetroE is a computer network that covers a metropolitan area based on the Ethernet standard. While FE refers to various Ethernet standards that carry traffic at a rate of 100 Megabit per second, GbE can transmit data packets or frames up to one (1) gigabit per second.

SIAD 106, in one embodiment, includes Ethernet ports such as FE or GbE ports able to receive and send data over an Ethernet backhaul. For an Ethernet configuration, while existing T1/IMA interfaces transit to MetroE, T1 and/or DS3 ports will not be used for long haul data transmission. For example, after SIAD 106 is installed and powered up, SIAD 106 automatically generates a transport IP address from a temporary configuration once a MetroE link interface is detected. Although SIAD 106 supports multiple link interfaces, the temporary IP address, which is temporary and valid for a predefined period of time, should not cause any conflicts with any other IP addresses and interfaces. Once the temporary configuration is established, SIAD 106 pings core router 110 indicating that SIAD 106 is currently reachable via the temporary IP address(es).

FIG. 2C is a block diagram 250 illustrating an exemplary communications network using DS3 circuit for data transmission with SIAD 106 capable of implementing temporary configuration in accordance with one embodiment of the present invention. Diagram 250 includes SIAD 106, a core router 110, and a DAC 204 wherein SIAD 106, core router 110, and DAC 204 are coupled by connections 256-258. SIAD 106, as described in FIG. 1, includes an IPC capable of provisioning a temporary link configuration. Connection 258 employs DS3 circuit as a carry for data transmission while connection 256 uses T1 circuit as a carry. It should be noted that the underlying concept of the embodiment does not change if one or more functional devices were added to or removed from system 250.

A DS3 circuit 258, also known as T3, is a digital signal level 3 T-carrier capable of providing high-speed internet communications. A DS3, for example, has a bandwidth of 45

Megabit per second. SIAD 106, in one embodiment, includes DS3 ports configured to communicate with core router 110 using a DS3 backhaul. For a DS3 backhaul configuration, both short haul as well as long haul communications will be using DS3 interfaces. For example, while DS3 is used for data bearer traffic and controlling traffic, T1 may be used for BTS timing.

A purpose of using the IPC of SIAD is to reduce and/or eliminate the need of loading initialization information onto SIAD 106 upon initial installation. As soon as SIAD 106 is powered up and the link configuration is detected, interface and provision of temporary IP addresses are automatically activated. SIAD 106 subsequently becomes accessible using the temporary IP address by the user. Once SIAD 106 is activated and reachable by a user remotely, the user then loads full configuration and/or permanent configuration onto SIAD 106. Once the full scripts are loaded, the temporary configuration is removed.

Figure 3:
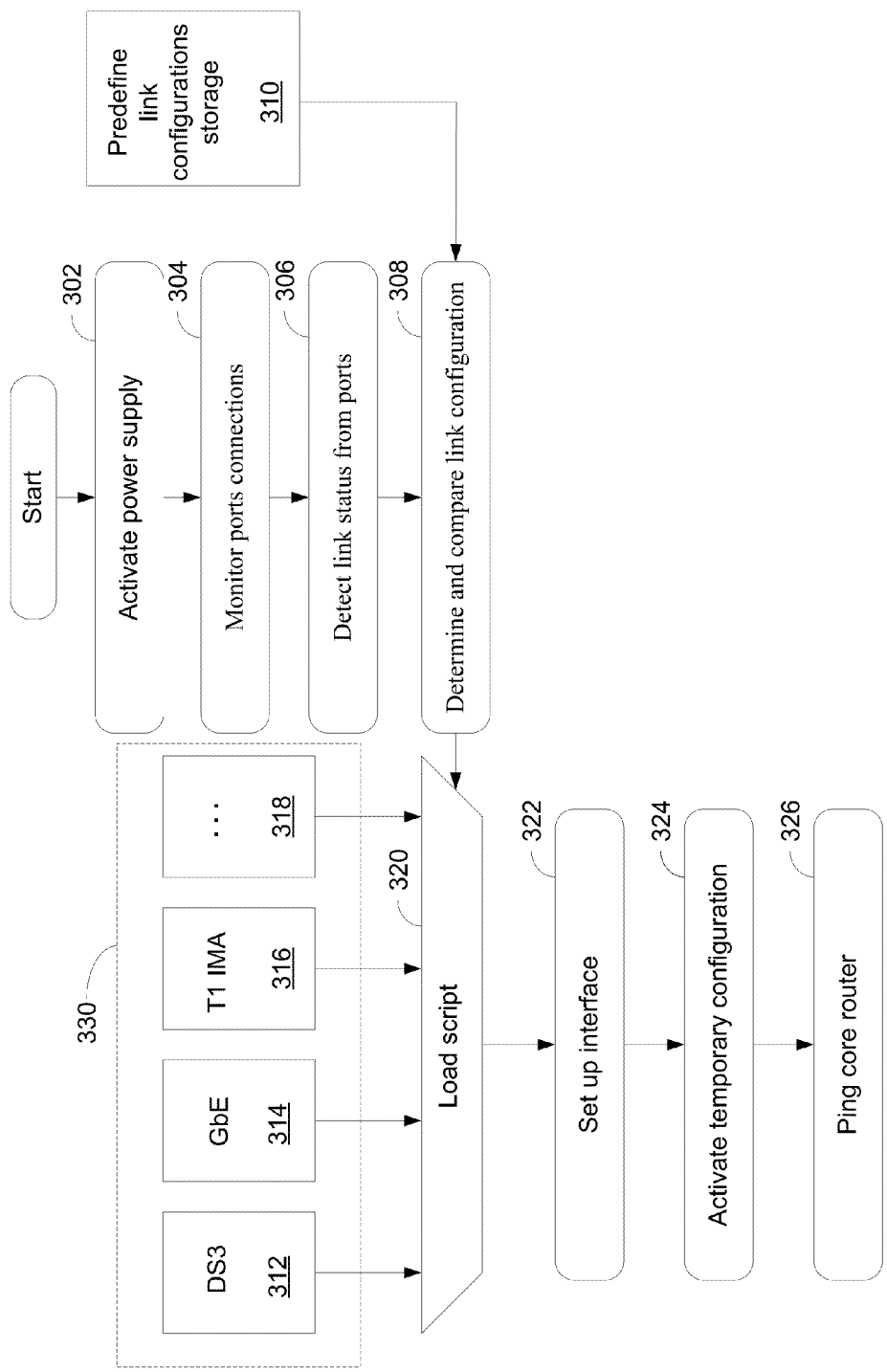
FIG. 3 is a logic block diagram illustrating a process of establishing connections using temporary IP address(s) in accordance with one embodiment of the present invention.

FIG. 3 is a logic block diagram illustrating a process of establishing network connections using temporary IP address(es) in accordance with one embodiment of the present invention. Upon installation of an access device or SIAD, the access device is powered up at block 302. When the access device is initially powered up, the device is set to default configuration by the boot process or IPC process wherein all connections or ports associated with the device are essentially down. Every port of the device is required to be provisioned before it can be used for communicating with other network devices.

As soon as the access device is set to the default configuration, various ports coupled to various links are monitored at block 304. Upon detecting the link status from a port or ports at block 306, the process of IPC is able to fetch predefined link configurations from storage at block 310. At block 308, the process determines the link configuration by comparing the detected link configuration with the predefined link configurations. Note that predefined link configurations, such as DS3, GbE, T1 IMA, et cetera, are preloaded onto the access device during the device manufacturing process.

Upon determining the link configuration, the process of IPC selects DS3 script, GbE script, T1 IMA script, or other script at block 320 for setting up an interface. It should be noted that DS3 script, GbE script, T1 IMA script, or other script are preloaded into various storage locations at blocks 312-318. Preloading various scripts into storage locations during blocks 312-318 may be performed during the manufacturing process at block 330 or before the installation. An interface capable of talking to the link connected to a core router is isolated and provisioned at block 322. At block 324, a temporary configuration is activated and is ready to transmit/receive information using one or more temporary IP addresses. The process of IPC subsequently pings the core router informing the core router that the access device is reachable via the attached temporary IP address(es) at block 326. When the core router notices that the access device is reachable, it sends the full provisioning information including permanent configuration to the access device. The access device replaces its temporary configuration with the permanent configuration received from the core router. The network connection for the access router is established.

Figure 4:
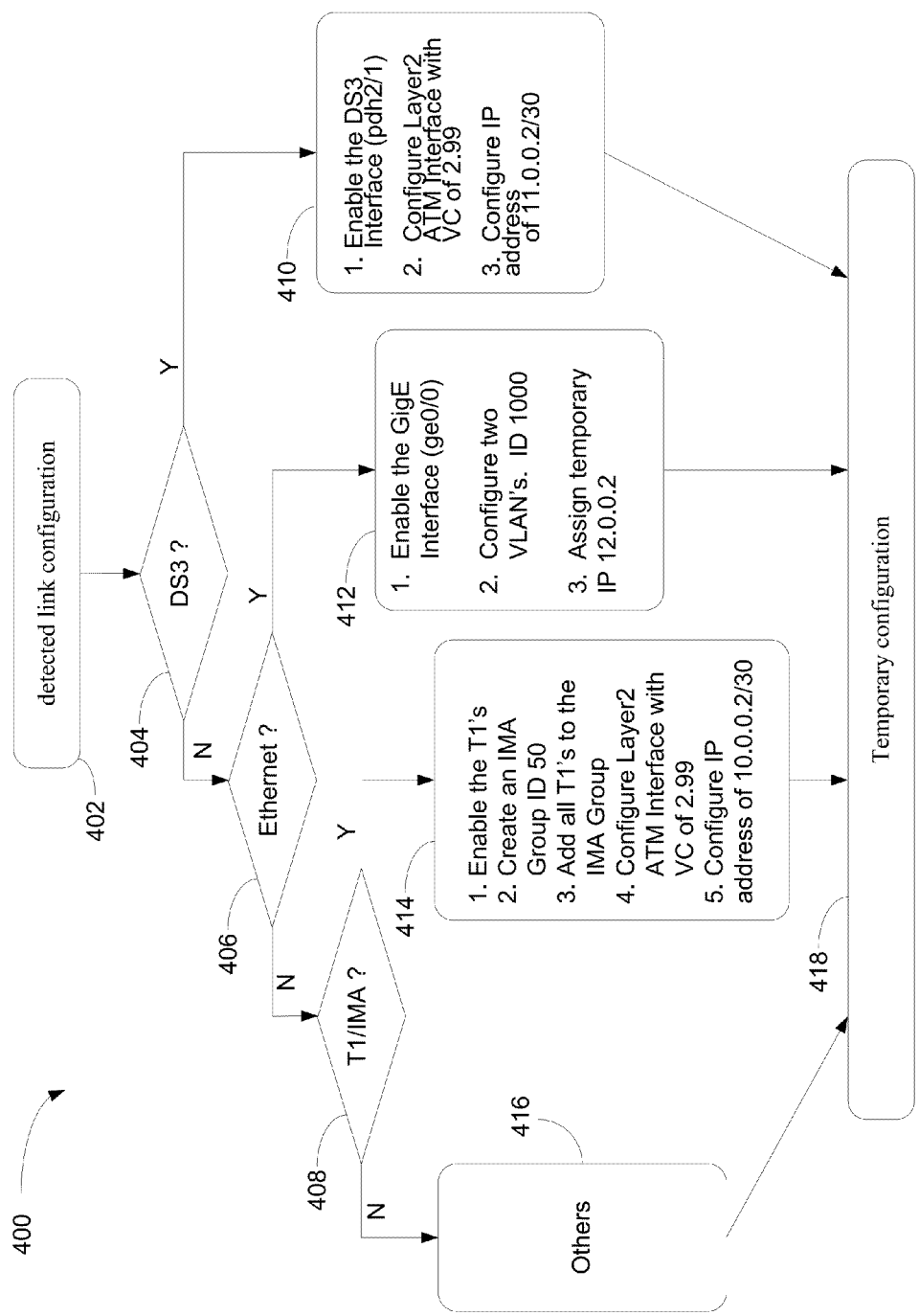
FIG. 4 is a flowchart illustrating a process of generating scripts for temporary configuration in accordance with one embodiment of the present invention.

FIG. 4 is a flowchart 400 illustrating an IPC process of a SIAD for generating scripts for establishing temporary configurations in accordance with one embodiment of the present invention. In one embodiment, the process provides an automatic activation of ports upon detecting active link connection(s). When the SIAD is initially powered up, all ports are disconnected from the unit. Once the system is up, available ports of SIAD connected to the service provider may be physically attached or connected. After the default configuration is set, the SIAD begins to monitor and detect the link status of its ports at block 402. It should be noted that at any given time, the SIAD can generally support one configuration, such as T1 IMA, Ethernet, or DS3. The SIAD, in one embodiment, needs to load predefined script(s) based on which interfaces may potentially be activated.

At block 404, the process of IPC compares the detected link configuration with a list of predefined link configurations. If the link configuration is DS3, the process proceeds to block 410. At block 410, the process configures the temporary configuration to DS3 including temporary IP address(es). For example, when the SIAD boots up and detects that DS3 port PDH2/1 link is up or active, the process enables the DS3 Interface (pdh2/1). Upon configuring Layer2 ATM Interface with VC of 2.99, IP address of 11.0.0.2/30 is configured. After establishing the temporary IP address, the process proceeds to block 418 indicating that the core router can now be pinged via the DS3 port PDH2/1 interface.

If the link configuration is not DS3, the process proceeds to block 406 to determine whether the link configuration is Ethernet. If the link configuration is Ethernet, the process proceeds to block 412. At block 412, the process configures the temporary configuration to Ethernet including temporary IP address(es). For example, when a SIAD is powered up and subsequently detects an FE or GbE link configurations, the process enables the GigE Interface (ge0/0). After configuring two (2) VLAN's (virtual local area network) with ID equals to 1000, temporary IP address (12.0.0.2) is assigned. After establishing the temporary IP address, the process proceeds to block 418 indicating that the core router can now be pinged via the FE or GbE interface.

If the link configuration is not Ethernet, the process proceeds to block 408 to determine whether the link configuration is T1 IMA. If the link configuration is T1 IMA, the process proceeds to block 414. At block 414, the process configures the temporary configuration to T1 IMA including temporary IP address(es). For T1 IMA, not all of the T1's may need to be initialized. To establish connectivity to the SIAD, at least one of the T1 line in the IMA Group needs to be up. For example, when SIAD boots up and detects a T1 link configuration, the process of IPC enables the T1 line and creates an IMA Group ID to be 50. After adding all T1 lines to the IMA Group, Layer2 ATM Interface with VC of 2.99 is configured. After Layer 2 configuration, IP address of 10.0.0.2/30 is subsequently configured. Upon establishing the temporary IP address, the process proceeds to block 418 indicating that the core router can now be pinged via T1 IMA interface.

If the link configuration is not T1 IMA at block 408, the process proceeds to block 416 to determine whether the link configuration can be identified with other link configurations such as E1 or E3. If the link configuration is identified at block 416, the process configures a temporary configuration including temporary IP address(es) in accordance with the definitions and/or specifications stored in block 408. After establishing the temporary IP address, the process proceeds to block 418 indicating that the temporarily provisioning process is completed.

Once the temporary configuration is in place, a core router, which is preloaded with temporary initialization scripts, can reach or configure the access device or SIAD in accordance with the direction or instruction of a remote user. To implement and/or acknowledge temporary configuration from a remote access device, the core router is required to load corresponding temporary interface and/or Internet Protocols ("IP's"). For example, to access an access device or a SIAD as illustrated in FIG. 4, the core router is required to preload exemplary scripts showing in the following Table.

TABLE

| Link Protocol | Configuration |
|---|---|
| DS3 | Creating DS3 Interface and configure Layer 2 VC of 2.99 and Layer 3 IP of 11.0.0.1. |
| Ethernet | Creating GigE Interface with VLAN ID 1000 and a Layer 3 address of 12.0.0.1. |
| T1 IMA | Creating an IMA Group with associated T1's. On IMA Interface, configure Layer 2 ATM VC of 2.99 and Layer 3 IP address of 10.0.0.1. |

FIGS. 5A-B illustrate preloaded code, pseudo program, and/or scripts 500 for establishing temporary network connections having loaded onto an access device in accordance with one embodiment of the present invention. To implement IPC for an access device or SIAD, basic configuration of "enabling ports," "configuring layer 2 and 3 interfaces," and "configuring IP address(s)," are required. The IP address assigned to an interface is a point-to-point transport address including at least two (2) valid IP addresses. For example, once an interface is up and one of the two IP addresses is assigned to the SIAD, the other IP address as the $2^{nd}$ Host IP address is provisioned or assigned to the core router whereby the SIAD and the core router can communicate via the assigned IP addresses.

Script 502 is an exemplary program capable of being preloaded onto an access device or a SIAD for temporarily provisioning T1 IMA interface(s). Script 502, in one embodiment, implements the following sequence to establish a temporary T1 IMA configuration with T1 IMA temporary IP addresses.

T1/IMA Backhaul
  1. Enable the T1's
  2. Create an IMA Group ID 50
  3. Add all T1's to the IMA Group
  4. Configure Layer2 ATM Interface with VC of 2.99
  5. Configure IP address of 10.0.0.2/30

Script 504 is an exemplary program capable of being preloaded onto an access device or a SIAD for temporarily provisioning DS3 interface(s). Script 503, in one embodiment, implements the following sequence to establish a temporary DS3 configuration with temporary IP addresses.

DS3 Backhaul
  1. Enable the DS3 Interface (pdh2/1)
  2. Configure Layer2 ATM Interface with VC of 2.99
  3. Configure IP address of 11.0.0.2/30

Script 506 is an exemplary program capable of being preloaded onto an access device or a SIAD for temporarily provisioning Ethernet interface(s). Script 506, in one embodiment, implements the following sequence to establish a temporary Ethernet configuration with temporary IP addresses.

Ethernet Backhaul
  1. Enable the GigE Interface (ge0/0)
  2. Configure two VLAN's. ID 1000 and 2000
  3. Assign temporary IP 12.0.0.2 and 13.0.0.2

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 6A:
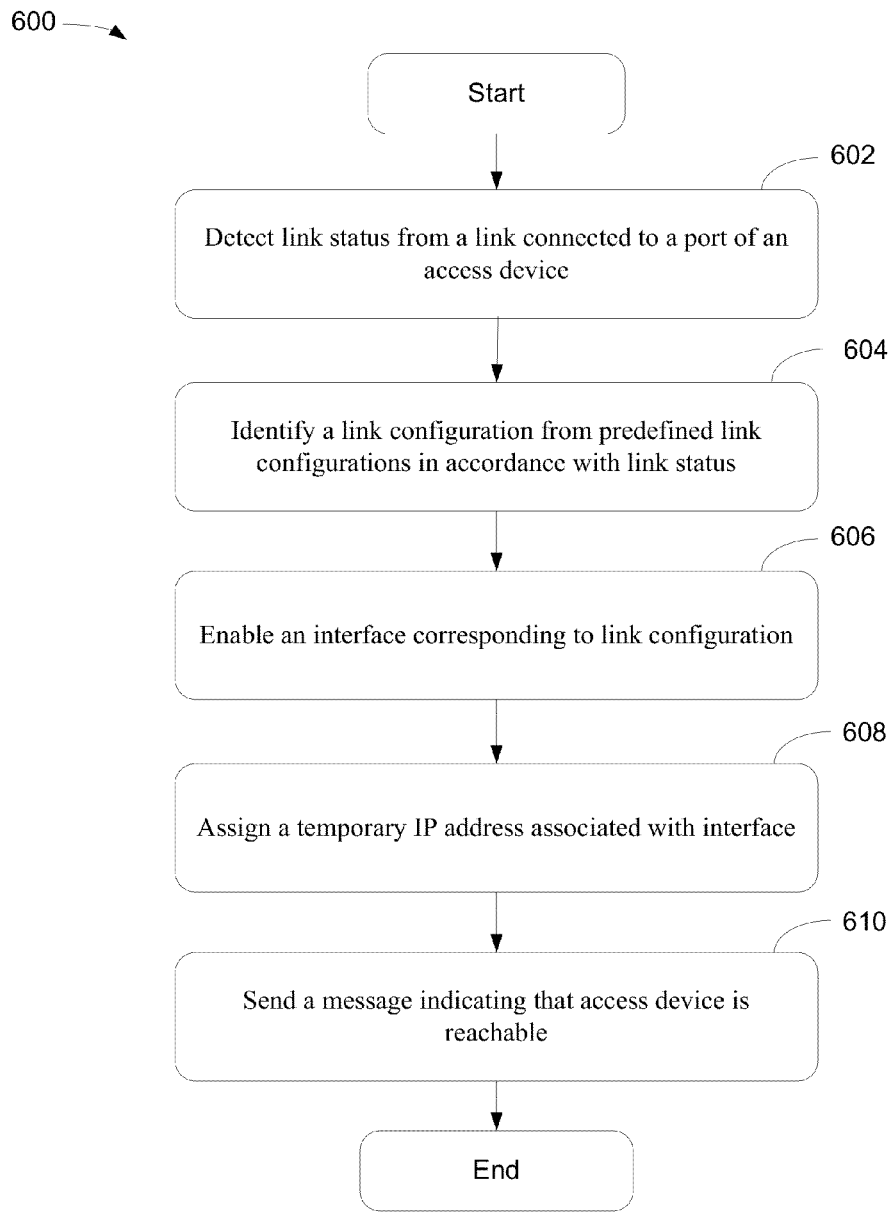
FIGS. 6A-B are flowcharts illustrating a process for generating a temporary configuration capable of establishing a network connection in accordance with one embodiment of the present invention.

FIG. 6A is a flowchart 600 illustrating a process for generating a temporary configuration capable of establishing a network connection in accordance with one embodiment of the present invention. At block 602, a process of IPC detects link status from a port coupled to a link, wherein the link connects between an access device and a core router (or a multi-service router). For example, the types of communication protocol or carry circuits on the link which is connected between a SIAD and a multi-service router is monitored. The process, in one embodiment, is configured to activate an initialization process of the access device after detecting a power-on procedure.

At block 604, the process identifies a link configuration from various predefined link configurations in accordance with the link status. In one embodiment, the process is capable of determining a DS3 configuration, an Ethernet configuration, a T1 IMA configuration, et cetera.

At block 606, the process enables an interface corresponding to the link configuration. In one example, upon enabling DS3 interface when the link configuration is a DS3 configuration, layer 2 ATM interface is configured. Alternatively, after enabling GigE interface when the link configuration is Ethernet configuration, VLAN ID is configured. In alternative aspect, upon enabling a T1 line when the link configuration is T1 IMA configuration, an IMA group is created. After adding all T1 lines to the IMA group, layer 2 ATM interface is subsequently configured.

At block 608, the process assigns a temporary IP address associated with the interface. The temporary IP address will allow a user to reach the access device via a multi-service router or a core router. It should be noted that the temporary IP address can be used to ping the core router via VPI/VCI (Virtual Path Identifier/Virtual Circuit Identifier). Note that VPC/VCI is used to identify the destination within a network.

At block 610, the process sends a message to the access device indicating that it is reachable via the link in response to the temporary IP address. The process is further capable of receiving information relating to permanent configuration from a user via the link. Upon identifying a permanent IP address from the permanent configuration, the temporary IP address is replaced with the permanent IP address. In one embodiment, the process activates a time-out counter after completion of a temporary configuration. The temporary configuration, in one aspect, is deactivated after the time-out counter reaches its predefined time limit. Alternatively, upon activating a wait-counter after removal of the temporary configuration due to the value of the time-out counter, the temporary configuration is reactivated when the wait-counter reaches its predefined waiting period.

Figure 6B:
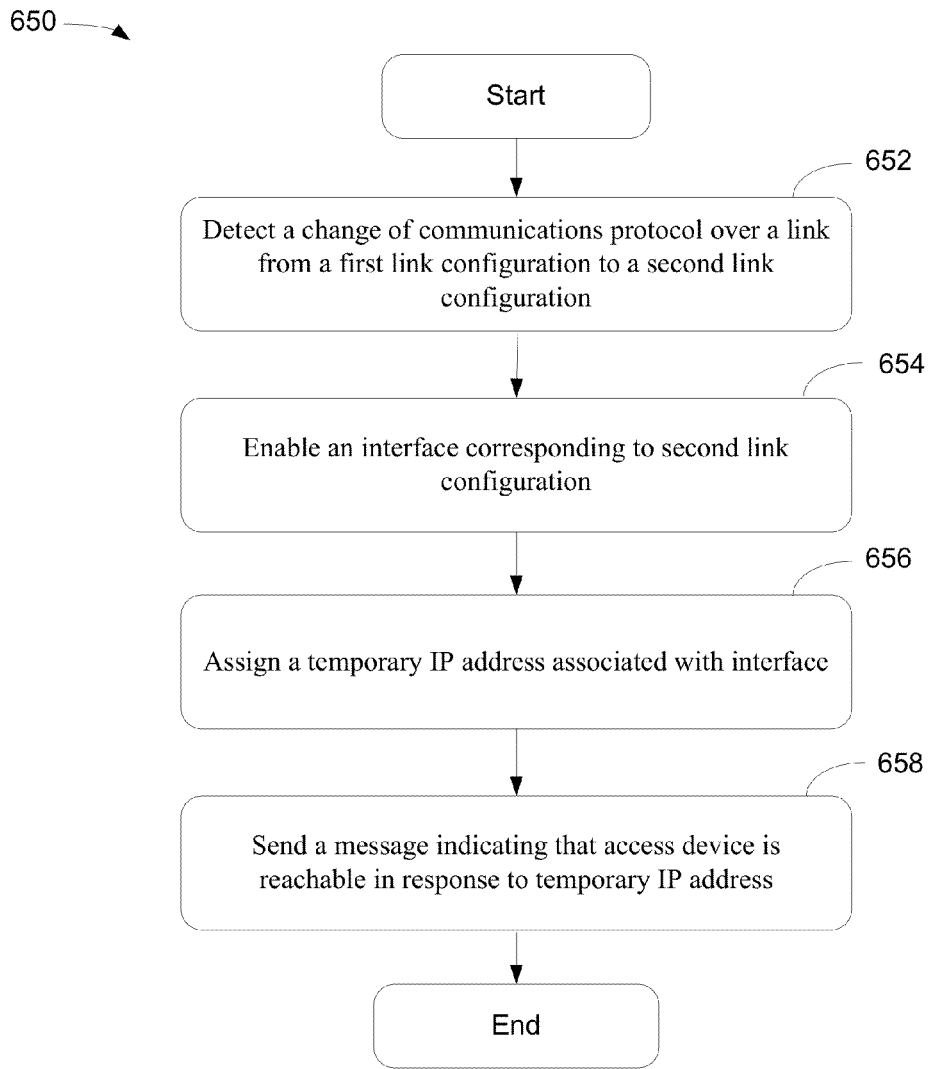

FIG. 6B is a flowchart 650 illustrating a process of generating a temporary connection upon detecting a change of link configuration in accordance with one embodiment of the present invention. At block 652, a process for maintaining a network connection detects a change of communications protocol over a link from a first link configuration to a second link configuration. Upon detecting the change, the process monitors communication protocol on a link between the SIAD and a core router (or a multi-service router).

While the process enables an interface corresponding to the second link configuration at block 654, a temporary IP address associated with the interface is assigned at block 656. At block 658, a message, which indicates that the access device is reachable in response to the temporary IP address, is sent. The process further receives information relating to permanent configuration from a user via the link. Upon identifying a permanent IP address from the permanent configuration, the temporary IP address is replaced with the permanent IP address. After activating a time-out counter after completion of a temporary configuration, the temporary configuration is deactivated after the time-out counter reaches its predefined time limit. Also, activating a wait-counter after removal of the temporary configuration due to the time-out counter, the process reactivates the temporary configuration when the wait-counter reaches a predefined waiting period.

Figure 7:
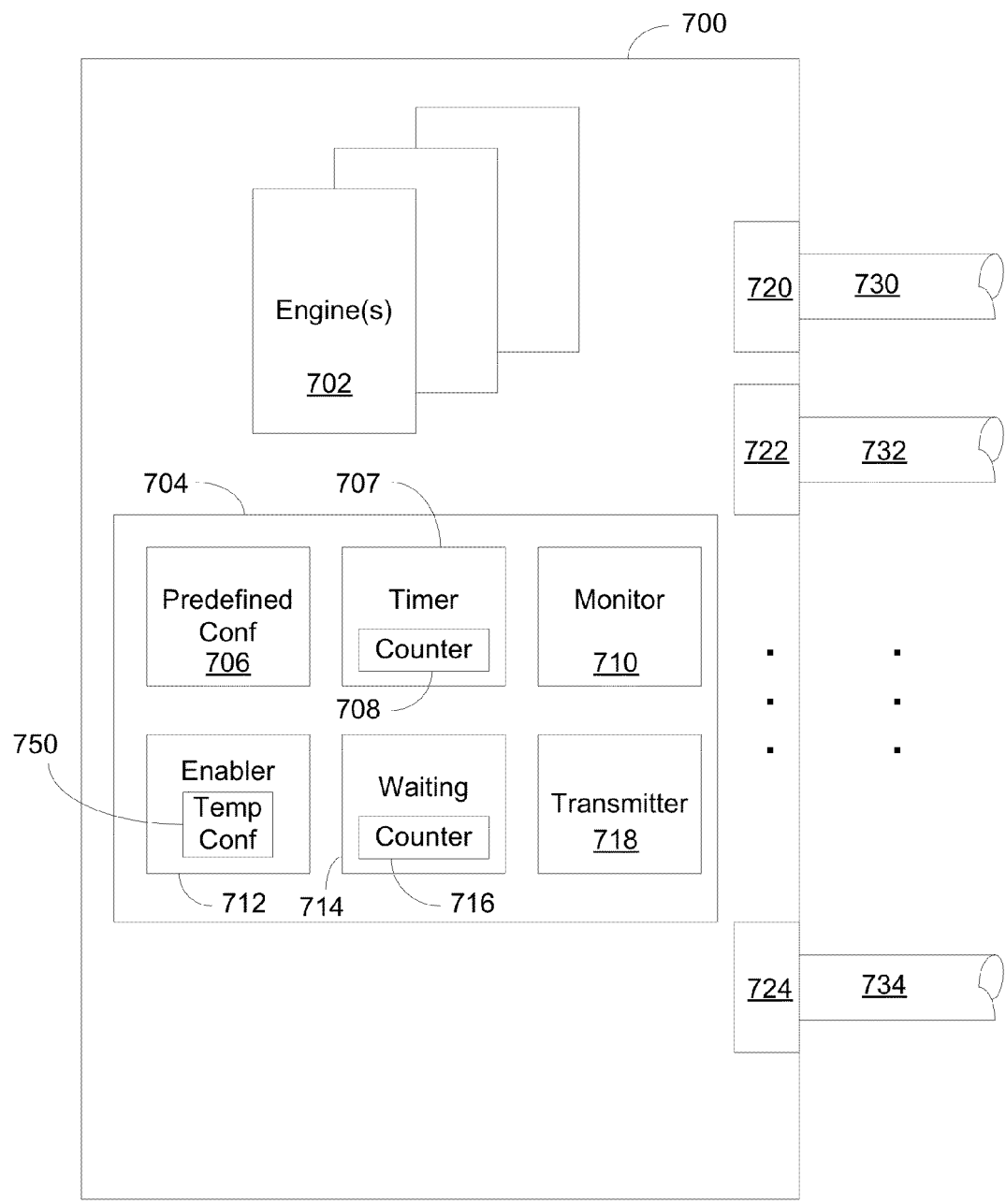
FIG. 7 is a block diagram illustrating an access device having various components capable of generating a temporary configuration in accordance with one embodiment of the present invention.

FIG. 7 is a block diagram illustrating an access device 700 having various components capable of generating a temporary configuration in accordance with one embodiment of the present invention. Access device 700 includes a processor 702 and a memory 704 wherein process 702 may includes multiple engines or controllers. In one embodiment, device 700 further includes multiple ports 720-724 configured to couple to multiple links 730-734 for network communications. It should be noted that the underlying concept of the embodiment does not change if one or more components were added to or removed from device 700.

Memory 704 includes a configuration storage 706, a timer 707, a monitor 710, an enabler 712, a waiting component 714, and a transmitter 718. While configuration storage 706 stores predefined link configuration such as DS3 and Ethernet, monitor 710 is able to monitor and detect link status via ports 720-724. Enabler 712 includes multiple temporary configurations capable of provisioning the system to a specific configuration in response to the detected link status. Transmitter 718, in one embodiment, is able to ping the core router via one of ports 720-724 using the temporary IP address. Timer 707 includes a temporary counter 708 capable of counting in response to a predefined value. Timer 707 is used for timed temporary configuration to keep the temporary configure in place until the counter expires or reaches to a predefined value. Waiting component 714 having a wait-counter 716 is configured to reactivate the temporary configuration when wait-counter 716 reaches to a predefined number. It should be noted that configuration storage 706, timer 707, monitor 710, enabler 712, waiting component 714, and transmitter 718 may be combined into one or more components or modules which can be implemented by hardware, firmware, software, or a combination of hardware, firmware, and software.

In one embodiment, the temporary configurations established for the device are considered to be temporary. The temporary configuration allows a timed and temporary access by a user whereby full and complete script can be loaded remotely to the access device. For example, as soon as a user logs in and enters a permanent configuration, the entered configuration becomes permanent. To prevent potential conflicts of IP addresses, the access device, after installation, deactivates the temporary configuration after certain amount of time.

The access device, in one embodiment, is able to temporarily provision its connection due to configuration change over the connected link. For example, a user can change a link configuration from an existing configuration to a new link configuration. Upon detecting the change, the access device begins to monitor and detect the link status of each port to identify the new configuration. The scenario of switching link configuration, for example, may occur when a site has T1 line at the time of turned up, the site, at a later time, determines that DS3 interface is needed for the backhaul transport. The access device, in this embodiment, reinitiates the temporary configuration when there are changes in the link up status. For instance, when the access device detects that a link is down over T1 links and a link using DS3 circuit is up at a later time, the access device reactivates the temporary configuration to support the DS3 configuration. The permanent configuration is subsequently loaded via the temporary configuration.

Figure 8:
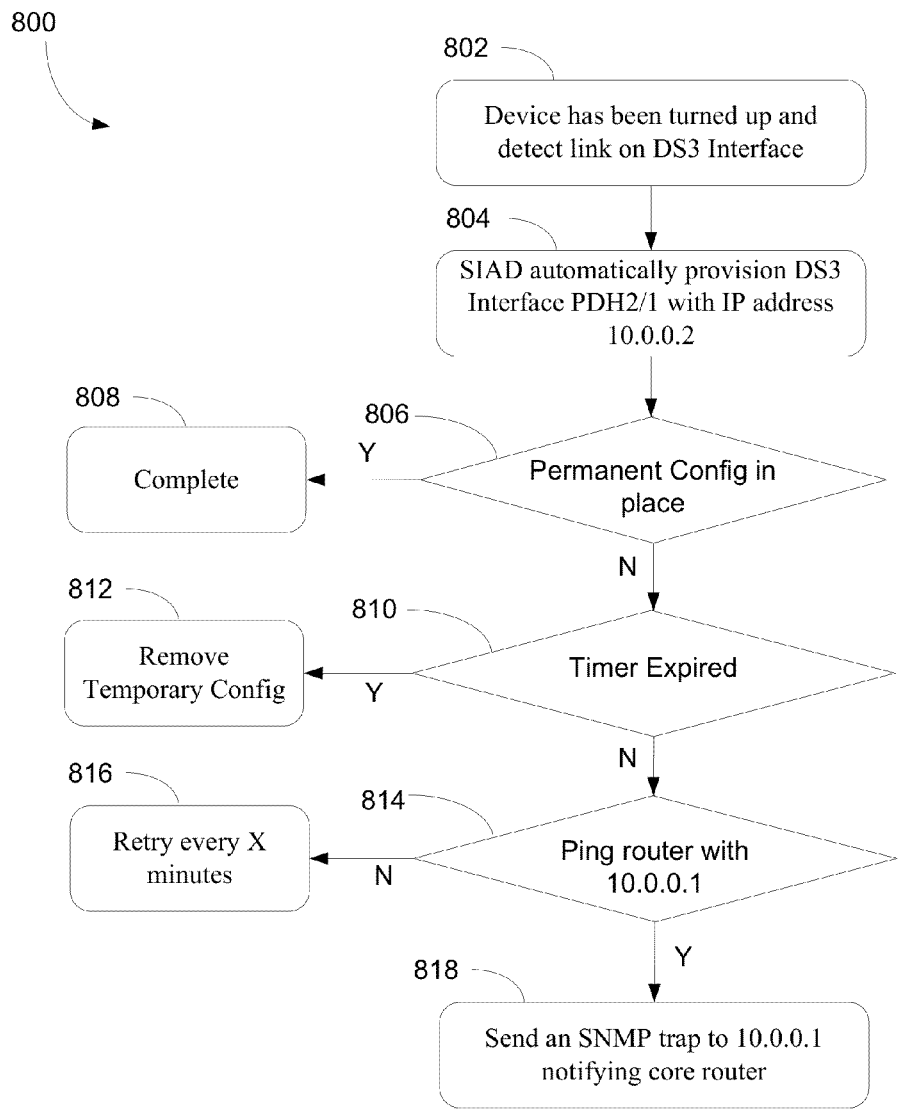
FIG. 8 is a flowchart illustrating a process for establishing a connection using a temporary configuration in accordance with one embodiment of the present invention.

FIG. 8 is a flowchart 800 illustrating a process for establishing a connection using a temporary configuration in accordance with one embodiment of the present invention. As a way to notifying a user that the temporary configuration is in place, the access device or SIAD automatically sends out SNMP (Simple Network Management Protocol) Trap to the Transport IP address at the remote end. For example, a SIAD issues the SNMP Trap when interface on SIAD and temporary transport IP address have been configured whereby it can reach its destination specified by the Transport IP address via a ping command. Upon notifying by a core router indicating that the SIAD is initiated with a timed temporary configuration, the user has an opportunity to log in the SIAD remotely before the timed temporary configuration expires. After logging into the SIAD, the user can provision the SIAD with a permanent configuration remotely.

Flowchart 800 illustrates an exemplary process for detecting a DS3 link status at block 802. At block 804, the process automatically provisions temporary DS3 interface with PDH2/1 with IP address of 10.0.0.2. At block 806, the process examines whether a permanent configuration is in place. If the permanent configuration is in place, the process proceeds to block 808 where the process ends. Otherwise, the process proceeds to block 810 to examine whether the timer has expired. If the timer is expired, the process moves to block 812 where the temporary configure is removed. If the timer is not expired, the process proceeds to block 814 to determine whether the core router can be pinged using IP address of 10.0.0.1. If the core router is pingable, the process, at block 818, sends an SNMP Trap to IP address of 10.0.0.1 notifying the core router that the temporary configuration is in place. Otherwise, the process proceeds to block 816 to retry at a predefined time frame such as every two minutes.

If the timer expires after a predefined amount of time and the permanent configuration is still not in place, the access device, in one embodiment, will automatically remove the temporary configuration and revert back to the factory configuration. At this point the device will no longer be reachable. The access device, in one embodiment, waits for a predefined period of time and reattempts to initiate the temporary configuration. When the timer expires, the access device periodically detects the link status using a predefined time interval, and once it detects an active link, the access device initiates a temporary configuration in accordance with detected link status. Alternatively, the reactivation of the temporary configuration can also be accomplished by power cycling of the device.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A method for establishing a network connection, comprising:
   detecting link status of a link by a port of an access device coupled to the link prior to assignment of Internet Protocol ("IP") address to the access device;
   identifying a link configuration from a plurality of predefined link configurations in accordance with the link status;
   enabling an interface corresponding to the link configuration;
   assigning a temporary IP address associated with the interface; and
   sending a message indicating that the access device is reachable via the link in response to the temporary IP address.

2. The method of claim 1, further comprising receiving information relating to permanent configuration from a user via the link.

3. The method system of claim 2, further comprising:
   identifying a permanent IP address from the permanent configuration; and
   replacing the temporary IP address with the permanent IP address.

4. The method of claim 1, further comprising activating an initialization process of the access device after detecting a power-on procedure.

5. The method of claim 1, further comprising activating a time-out counter after completion of a temporary configuration.

6. The method of claim 5, further comprising deactivating the temporary configuration after the time-out counter reaches its predefined time limit.

7. The method of claim 6, further comprising:
   activating a wait counter after removal of the temporary configuration due to the time-out counter; and
   reactivating the temporary configuration when the wait counter reaches to a predefined waiting period.

8. The method of claim 1, wherein detecting link status further includes monitoring communication protocol on the link connected between a smart integrated access device ("SIAD") and a core router over a wireless backhaul.

9. The method of claim 1, wherein identifying a link configuration further includes determining one of a digital signal 3 ("DS3") configuration, an Ethernet configuration, and a T1 inverse multiplexing Asynchronous Transfer Mode ("IMA") configuration.

10. The method of claim 9, wherein enabling an interface corresponding to the link configuration includes,
    enabling DS3 interface when the link configuration is a DS3 configuration; and
    configuring layer 2 Asynchronous Transfer Mode ("ATM") interface.

11. The method of claim 9, wherein enabling an interface in response to the link configuration includes,
    enabling gigabit Ethernet ("GigE") interface when the link configuration is Ethernet configuration; and
    configuring Virtual Local Area Network ("VLAN") identification ("ID").

12. The method of claim 9, wherein enabling an interface in response to the link configuration includes,
    enabling T1's when the link configuration is T1 IMA configuration;
    creating an IMA group;
    adding all T1's to the IMA group; and
    configuring layer 2 ATM interface.

13. The method of claim 9, wherein assigning a temporary IP address associated with the interface includes configuring a temporary IP address reachable by a user via a multi-service router.

14. A communications network, comprising:
    a router capable of routing information between network devices; and
    an access device coupled to the router and configured to route information to its destination via its switching functions, wherein the access device includes a digital processor and a memory, wherein the memory includes:
    a monitoring module capable of detecting link status from a link connected between a port of the access device and the router prior to assignment of Internet Protocol ("IP") address to the access device, and identifying a link configuration in accordance with the link status;
    an enabler configured to enable an interface corresponding to the link configuration and assign a temporary Internet Protocol ("IP") address associated with the interface;
    a transmitter sending a message to the router indicating that the access device is reachable via the link in response to the temporary IP address.

15. The network of claim 14, wherein the router is a multi-service router over a wireless backhaul and the access device is a smart integrated access device ("SIAD").

16. The network of claim 14, wherein the link configuration is one of a digital signal 3 ("DS3") configuration, an Ethernet configuration, and a T1 inverse multiplexing Asynchronous Transfer Mode ("IMA") configuration.

17. The network of claim 14, further includes a user coupled to the router and capable of remotely reconfiguring the access device via an established link.

18. A method for maintaining a network connection, comprising:
    detecting a change of communications protocol over a link from a first link configuration to a second link configuration by an access device;
    enabling an interface corresponding to the second link configuration at the access device prior to assignment of Internet Protocol ("IP") address associated with the interface corresponding to the second link configuration to the access device;
    assigning a temporary Internet Protocol ("IP") address associated with the interface; and
    sending a message indicating that the access device is reachable in response to the temporary IP address.

19. The method of claim 18, further comprising,
    receiving information relating to permanent configuration from a user via the link;
    identifying a permanent IP address from the permanent configuration; and
    replacing the temporary IP address with the permanent IP address.

20. The method of claim 18, further comprising,
    activating a time-out counter after completion of a temporary configuration; and
    deactivating the temporary configuration after the time-out counter reaches its predefined time limit.

21. The method of claim 20, further comprising:
    activating a wait counter after removal of the temporary configuration due to the time-out counter; and
    reactivating the temporary configuration when the wait counter reaches a predefined waiting period.

22. The method of claim 18, wherein detecting a change of communications protocol over a link further includes monitoring communication protocol on the link connected between a smart integrated access device ("SIAD") and a multi-service router over a wireless backhaul.

* * * * *